United States Patent
Aref et al.

(10) Patent No.: US 6,473,809 B1
(45) Date of Patent: Oct. 29, 2002

(54) SCHEDULING METHOD AND APPARATUS FOR NETWORK-ATTACHED STORAGE DEVICES AND OTHER SYSTEMS

(75) Inventors: Walid G. Aref, New Brunswick, NJ (US); Ibrahim Mostafa Kamel, Monmouth Junction, NJ (US); Sarit Mukherjee, Mount Laurel, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/368,061

(22) Filed: Aug. 3, 1999

(51) Int. Cl.⁷ .............................. G06F 3/00; G06F 3/02; G06F 12/00; G06F 12/14
(52) U.S. Cl. ........................ 710/6; 710/40; 711/111
(58) Field of Search ........................ 710/5, 6, 30, 40, 710/56; 711/111, 158

(56) References Cited

U.S. PATENT DOCUMENTS

| | | | |
|---|---|---|---|
| 5,367,669 A | * 11/1994 | Holland et al. | 714/7 |
| 5,426,736 A | * 6/1995 | Guineau, III | 710/56 |
| 5,455,934 A | 10/1995 | Holland et al. | 395/404 |
| 5,644,786 A | * 7/1997 | Gallagher et al. | 710/30 |
| 5,729,688 A | * 3/1998 | Kim et al. | 709/226 |
| 5,734,893 A | * 3/1998 | Li et al. | 707/104 |
| 6,157,963 A | * 12/2000 | Courtright, II et al. | 710/5 |
| 6,272,606 B1 | * 8/2001 | Dorricott et al. | 711/158 |
| 6,282,607 B1 | * 8/2001 | Hillyer et al. | 711/111 |

FOREIGN PATENT DOCUMENTS

JP  407239756 A  * 9/1995

OTHER PUBLICATIONS

Patents Act 1977 Search Report under Section 17 Preliminary Patentability Following Search.

"Linear Programming," McGraw–Hill Encyclopedia of Science & Technology, 6$^{th}$ Edition, pp. 82–83.

* cited by examiner

*Primary Examiner*—Thomas Lee
*Assistant Examiner*—Chun Cao
(74) *Attorney, Agent, or Firm*—Harness, Dickey & Pierce, P.L.C.

(57) ABSTRACT

A computer-implemented scheduling method and apparatus for scheduling operations relating to a predetermined activity. The activity includes scheduling operations of network-attached storage devices, or other computer-related operations, or non-computer related operations, such as manufacturing plant operations. Operational data is received that is indicative of the operations. Attributes regarding the received operational data are identified. A linear ordering of the attributes is imposed via a predetermined curve. The curve is an aggregation of at least substantially continuous functions from intervals so as to form a substantially repetitive pattern. Operations are scheduled based upon the imposed linear ordering. With such an approach, the overall performance aspects of the system is significantly improved.

52 Claims, 8 Drawing Sheets

SCHEDULING METHOD AND APPARATUS FOR NETWORK-ATTACHED STORAGE DEVICES AND OTHER SYSTEMS

BACKGROUND AND SUMMARY OF THE INVENTION

The present invention relates generally to computer-implemented schedulers, and more particularly to computer-implemented schedulers for computer operations and for other systems.

Scheduling which operations precede other operations is an omnipresent problem. This problem is encountered in determining which computer files are to be retrieved before other files from a computer storage device. This problem is also encountered in what computer threads are to be processed before other threads. Outside of the computer domain, this problem is encountered in manufacturing systems where it must be determined which manufacturing operations are to be performed before others. These are non-limiting examples of where scheduling problems arise.

A more detailed non-limiting example is provided within the context of computer information storage scheduling. The computer information storage scheduling problem is multi-dimensional in the sense that it involves many parameters and system components. With the high dimensionality of the scheduling space, it is difficult to implement a Network-Attached Storage Device (NASD) scheduling algorithm that takes into consideration such measures of goodness as disk scheduling performance aspects, network scheduling performance aspects, and real-time disk request deadlines. Previous storage scheduling approaches are not well suited for optimizing the NASD performance with respect to all of these measures of goodness. Accordingly, present scheduling approaches lack a viable global scheduling strategy for NASDs that simultaneously optimizes performance with respect to multiple measures of goodness.

The present invention overcomes this disadvantage as well as other disadvantages. In accordance with the teachings of the present invention, a computer-implemented scheduling method and apparatus is provided for scheduling operations relating to a predetermined activity. The activity includes scheduling operations of network-attached storage devices, or other computer-related operations, or non-computer related operations, such as manufacturing plant operations. Operational data is received that is indicative of the operations. Attributes regarding the received operational data are identified. A linear ordering of the attributes is imposed via a predetermined curve. The curve is an aggregation of at least substantially continuous functions from intervals so as to form a substantially repetitive pattern. Operations are scheduled based upon the imposed linear ordering. With such an approach, the overall performance aspects of the system is significantly improved.

For a more complete understanding of the invention, its objects and advantages, reference should be made to the following specification and to the accompanying drawings.

DESCRIPTION OF THE PREFERRED EMBODIMENT

Figure 1:
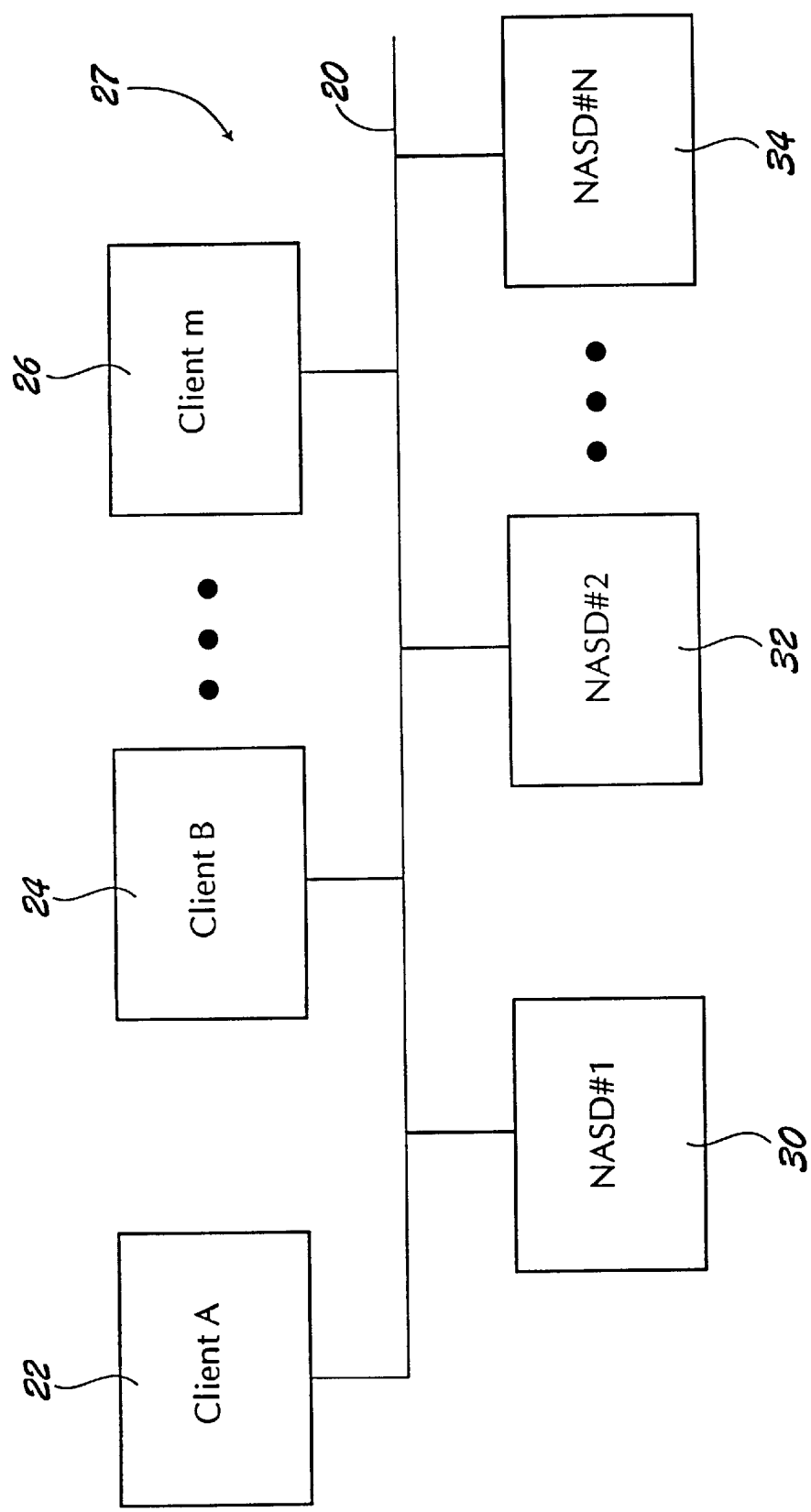
FIG. 1 is a block diagram depicting the networked system employing the present invention.

FIG. 1 depicts a network 20 with multiple clients (22, 24, 26) that request multimedia streams, and also depicts several network-attached storage devices (NASDs) (30, 32, 34) that are attached to network 20. Clients (22, 24, 26) request specific disk pages from NASDs (30, 32, 34), which are in turn, shipped through network 20 from the NASD containing the requested page to the client that requested the page.

The NASD System

Figure 2:
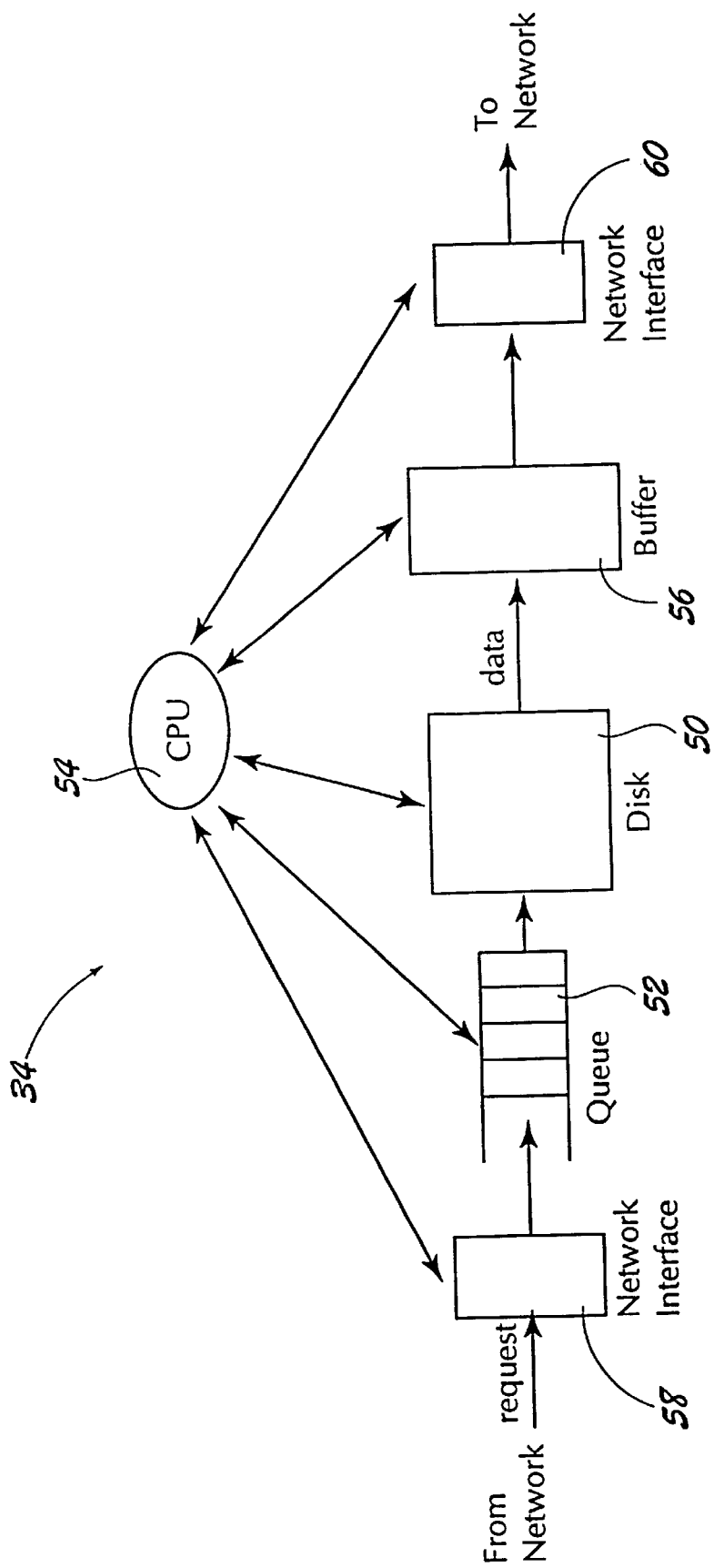
FIG. 2 is a schematic diagram depicting the preferred internal components for an NASD.

With reference to FIG. 2, an NASD 34 of the present invention preferably includes a disk 50, a request queue 52, a central processing unit 54, a buffer area 56 to store the pages read from disk, and a network connection via network interfaces 58 and 60. NASD 34 is a disk storage device that is directly connected to the network (not shown). NASD 34 has network interfaces 58 and 60 to receive requests for disk pages from the network and to send back the resulting data page(s) to the requestor client.

Once a request is received, it is queued into the disk queue 52. According to the present invention's scheduling algorithm that is executed by NASD CPU 54, the requests are ordered and processed by CPU 54 in that order. If the request is a read request, the data is retrieved from the disk and is preferably placed in disk buffer 56, waiting to be sent to the requestor. CPU 54 also schedules the order in which the pages in buffer 56 are sent over the network. In the preferred embodiment, this is done through network interfaces 58 and 60.

NASD Request Characterization

Figure 3:
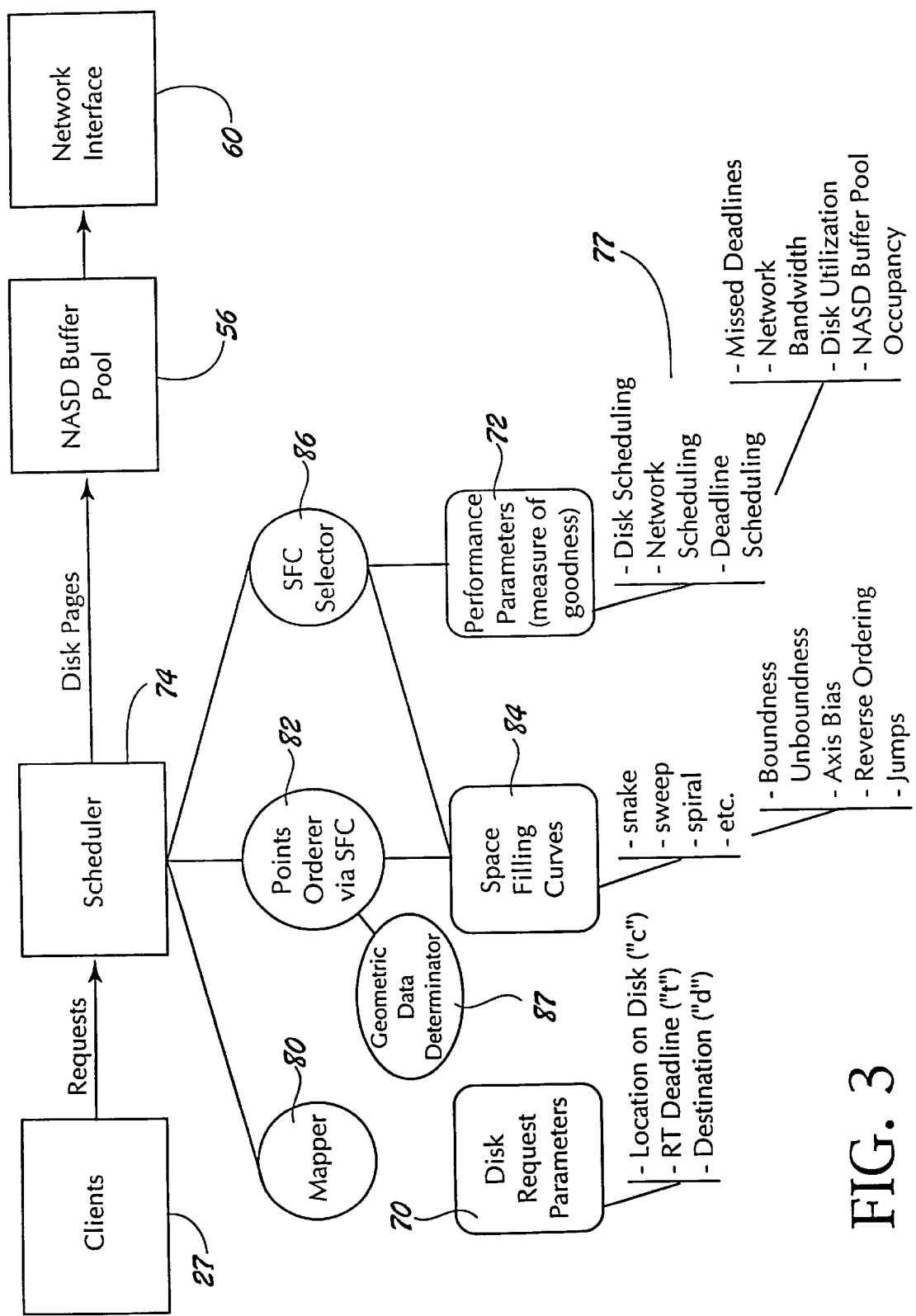
FIG. 3 is a block diagram depicting the functions and data utilized by the present invention.

With reference to FIG. 3, a client's disk page request r to a NASD can be characterized by the following parameters 70:

1. c: the disk cylinder number in which the disk page resides inside the NASD,
2. t: the request's real-time deadline, and
3. d: the request's network destination. The disk cylinder number determines the amount of disk seek time needed to retrieve the requested disk page. The request's real-time deadline is the time after which the request becomes effectively useless, and the request would be considered lost and/or unfulfilled. The request's network destination is where the requested data from the disk is to be sent. The network destination determines the propagation delay time it takes the requested data to reach its destination in the network. Therefore, a page request to a NASD can be modeled by the three-tuple: <c,t,d> which the present invention uses to determine a processing order for the page request.

NASD Request Processing

Based on the processing order as determined by the present invention, the NASD processes a request with the parameters <c,t,d>. Based on the cylinder location of the disk head and the request's location c, a certain amount of seek time ($t_c$) is spent until the disk head reaches cylinder c. A page p is retrieved from the disk and is placed in the NASD buffer pool 56 until p is submitted to its destination in the network. The NASD buffer pool 56 is an important resource as it isolates the effect of network delays from the rest of the system.

In order to send a page p across the network, p is removed from the NASD buffer pool 56, and given to network interface hardware 60. Preferably, network interface 60 uses the following protocol to send p to its destination in the network:

1. setting up the network connection with the destination
2. dividing p into packets
3. for each packet $p_i$:
   (a) sending $p_i$ over the network
   (b) waiting for an acknowledgement that $p_i$ is received
4. closing the connection with the destination In a non-limiting exemplary implementation, there are m clients 27 connected to a network that has several NASDs. Data is distributed in units of blocks to the NASDs in a random fashion. For a given NASD, a set of data read requests are queued. Each request is parameterized by a tuple <c,t,d>. The present invention orders these requests so as to enhance the overall system performance according to certain measures of goodness.

Measures of Goodness

Based on the characterization of the NASD requests according to the tuple <c,t,d>, the following four measures of goodness 72 are the preferred aspects utilized to concurrently optimize disk scheduling, network scheduling, and deadline scheduling aspects.

1. The request deadline misses: The requests that are not served before their deadline expires are said to be missed by the system. The target is to minimize the number of deadline misses.
2. The overall NASD bandwidth: This indicates the number of bytes per second that are shipped out of the NASD to their destination in the network. The target is to maximize the NASD bandwidth so that it is as close as possible to the network bandwidth.
3. The disk bandwidth: This is affected by the order in which the disk-requests are processed. If the requests are ordered in such a way that the seek time is minimized, then the disk bandwidth would be maximized. The target is to maximize the disk bandwidth.
4. The NASD buffer pool occupancy: This determines the size of the buffer pool necessary to accommodate the data pages before sending them to the network. The target is to minimize the occupancy of the buffer pool, so that the NASD does not get congested.

While the first two measures of goodness reflect the system overall behavior, the last two measures of goodness analyze why certain scheduling plans are better or worse than the others.

Part of the responsibility of scheduler 74 in NASD CPU is to schedule the requests. The overall goal is to enhance the system performance parameters 72 which center upon the following three scheduling activities 77:

1. disk scheduling
2. network scheduling
3. deadline scheduling

The target of disk scheduling is to enhance the performance of the disk by reducing the amount of time wasted in disk head movements. On the other hand, the target of network scheduling is to enhance the output network throughput of the NASD. Finally, the target of deadline scheduling is to reduce the number of client requests that miss their deadlines.

Instead of scheduling each NASD scheduler separately and/or independently of the other NASD schedulers that are on the network, the present invention provides an overall scheduling approach that meets the target of each scheduler without preferably favoring any of the schedulers over the others. In other words, scheduler 74 is typically "fair" to the NASD measures of goodness 72, and tries to meet the target of the other NASD schedulers.

Scheduler 74 includes a mapper 80 that maps disk request parameters/attributes (e.g., tuple <c,t,d>) 70 preferably onto an n-dimensional space. The mapped parameters for a disk request constitute a point in the n-dimensional space. Given a collection of these points, module 82 linearly orders the points so that the requests are processed in that order. Module 82 utilizes space-filling curves 84 in order to perform the linear ordering of the points. A space-filling curve acts like a thread that passes through every point in the n-dimensional space so that every point is visited only once. In this way, the use of the space-filling curves reduces the dimensionality of a disk request from an n-dimensional problem space to a single-dimension problem space. A single-dimension problem space is a reduction of the problem so as to provide for a linear ordering of points.

Different space filling curves 84 are used based upon the application at hand. A space-filling curve selector module 86 selects from a library of space filling curves the space-filling curve best suited for the application at hand. In the preferred embodiment, space-filling curve selector module 86 selects a space-filling curve to order the points based upon the following characteristics: whether a space-filling curve is pre-disposed towards an axis being bounded or unbounded in the n-dimensional space; whether a space filling curve is biased towards one of the axes; whether a space-filling curve exhibits reverse ordering in any/all of its dimensions; and whether a space-filling curve exhibits "jumps" in any of its dimensions.

Module 82 utilizes a geometric data determinator 87 in order to determine how the space-filling curve should intersect with the points. For a two-dimensional space, geometric data determinator 87 examines the geometric coordinates (i.e., x, y coordinates) of the mapped attributes to determine where they fall on the space-filling curve. For a three-dimensional space, geometric data determinator 87 examines the x, y, z geometric coordinates of each mapped point to determine where on the space-filling curve the points fall. The space-filling curve technique utilizes a curve with a predetermined shape which visits each point.

The space-filling curve technique is discussed in more detail after the discussion of the mapping onto the n-dimensional space technique.

Inserting a New Request

Figure 4:
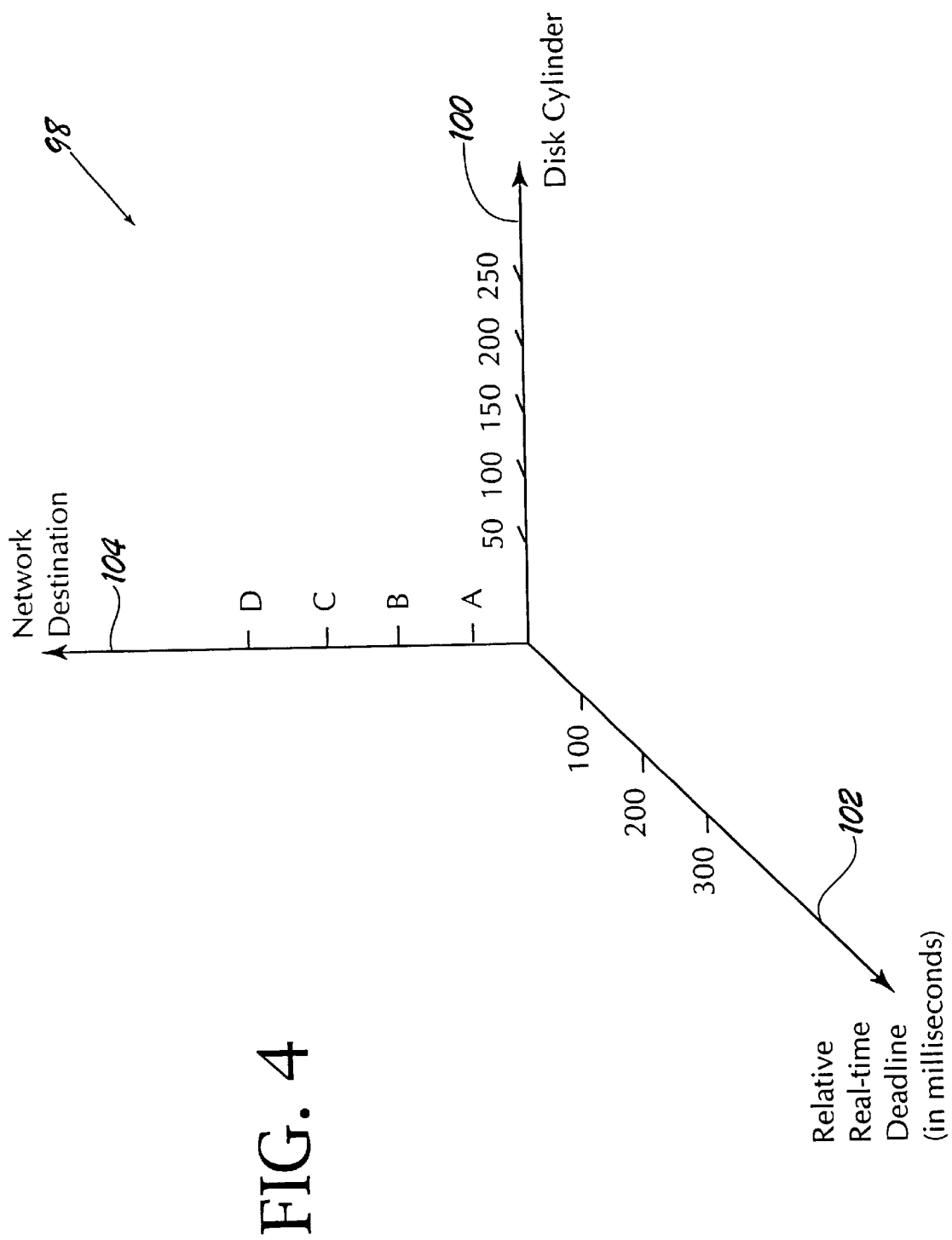
FIG. 4 is an x-y-z graph depicting an exemplary arrangement in three-dimensional space for attributes considered by the present invention in scheduling requests.

With reference to FIG. 4, assume that a three-dimensional space 98 is utilized where the first dimension 100 (the x-axis) represents the disk cylinder number, the second dimension 102 (the y-axis) represents the request's deadline, and the third dimension 104 (the z-axis) represents the network destination of the request.

The disk has a constant number of cylinders, numbered from 0 to $x_{max}$. Therefore, the x-axis 100 will have a maximum value of $x_{max}$ and all the clients' requests to the NASD will reside in the range [0, $x_{max}$], inclusive.

The real-time deadline can be an absolute deadline or a relative one. The decision to choose the deadline as relative or absolute may affect the range of values in the y-axis 102. In the case of having a relative real-time deadline, the values of the y-coordinate can vary from 0 up to the maximum possible relative delay $y_{max}$. In the case of having an absolute real-time deadline, the preferred embodiment does not include a maximum value for the y-coordinate, and hence the values of the y-coordinate are unbounded.

The z-axis 104 represents the network destination of the request, i.e., the client's location in the network where the result of the request (usually a disk page) will be shipped by the NASD. For example, assume that there are four network destinations A, B, C, and D. Each of the possible network destinations is mapped to one point in the z-axis 104. With this approach, the network destinations can be sorted based on their known average network delay. In this case, the destinations with less network delay are placed closer to the origin. Since the network delay may vary over time, the function that maps from the network destination into a corresponding location in the z-axis 104 may dynamically vary as time goes.

For example, by using a window over time, the average network delay is computed for every destination during the window period. The mapping function (from a network destination to a location in the z-axis) 104 is modified by the end of the window interval, if the delays happen to be significantly different. To avoid reshuffling the requests that are already scheduled, once the mapping function changes, only the newly arriving requests preferably are reshuffled and not the ones already inserted into the system.

Given a request r=<c,t,d> from a client to the NASD, the processor of the NASD inserts r as a point in the three-dimensional space 98.

Request Ordering via Space-Filling Curves

NASD requests are modeled as points in the three-dimensional space 98. Given a collection of these points, the points are linearly ordered so that the requests are processed in that order. The present invention utilizes space-filling curves in order to perform the linear ordering of the points.

One way of performing the mapping of the n-dimensional space into the one-dimensional space is by using space filling curves, e.g., the Peano curve, or the Hilbert curve These curves are generally discussed respectively in: G. Peano. Sur une courbe qui remplit toute une aire plaine. Mathematische Annalen, 36:157–160, 1890 (which translates into "G. Peano. On One Curve That Fills All of a Space Plane. Mathematical Annals, 1890); and D. Hilbert. Ueber stetige abbildung einer linie auf ein flashenstuck. Mathematische Annalen, 38:459–460, 1891 (which translates into D. Hilbert. On Steady Formation of a Line on a Bottle Head. Mathematical Annals, 1891).

Space-Filling Curves

A space-filling curve acts like a thread that passes through every cell element (or pixel) in the n-dimensional space so that every cell is visited only once. Thus, a space filling curve (SFC) imposes a linear order of the cells in the n-dimensional space. FIGS. 5a–5f illustrate in a non-limiting way several space-filling curves for the two-dimensional space. The passing of the curve through the points acts to reduce the problem space to a single dimension. A space-filling curve is an aggregation of a continuous functions from intervals so as to form a substantially repetitive pattern. The connection points between the intervals are non-differentiable.

Figure 5A:
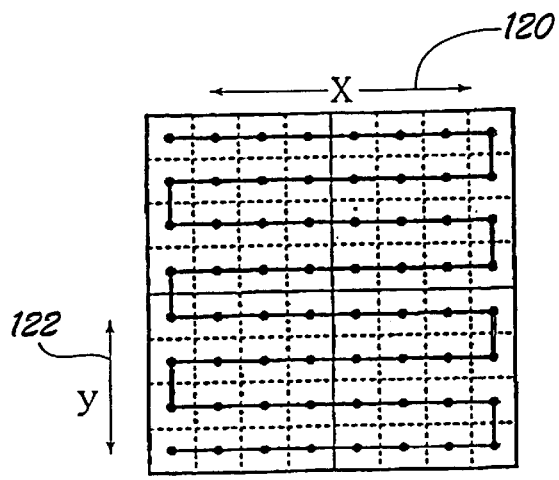
FIGS. 5a–5f are depictions of various exemplary space filling curves.
Figure 5B:
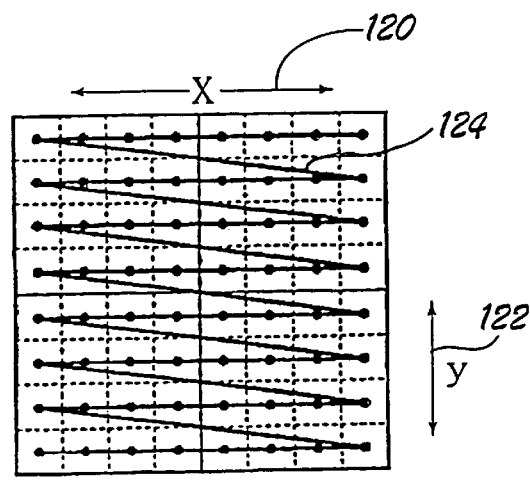
Figure 5C:
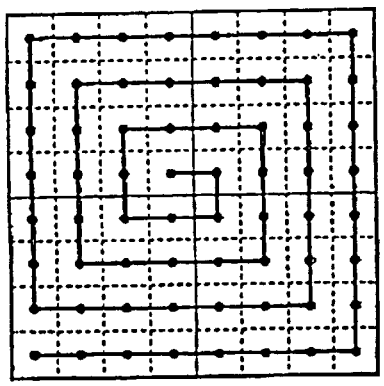
Figure 5D:
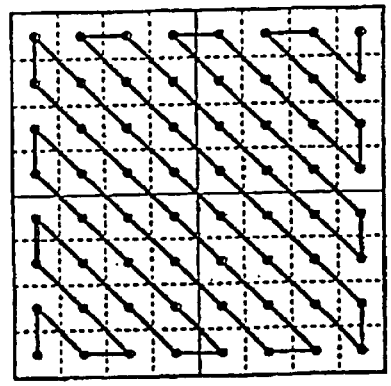
Figure 5E:
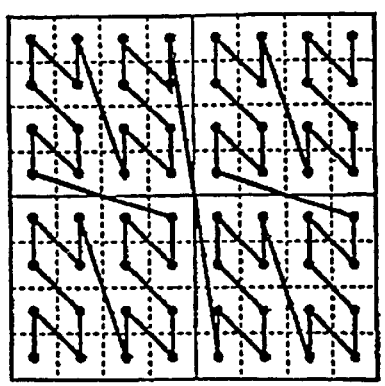
Figure 5F:
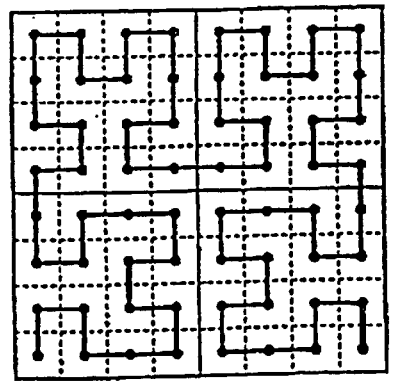

FIG. 5a is a snake space-filling curve; FIG. 5b is a sweep space-filling curve; FIG. 5c is a spiral space-filling curve; FIG. 5d is a zig-zag space-filling curve; FIG. 5e is a Peano space-filling curve; and FIG. 5f is an Hilbert space-filling curve.

Each space-filling curve has its own advantages and disadvantages which are discussed in greater detail below. However, it is to be understood that the present invention is not limited to only these space-filling curves, but includes, any space-filling curve that is suitable for the task at hand, as well as space filling curves which can handle additional dimensions in space (i.e., more than two dimensions).

Axis-Parameter Assignment and Bias

A difficulty with using SFCs for scheduling is the axis-parameter assignment problem. This problem can be described in the following way. Given that requests to be scheduled are characterized by three parameters (as is the case in the NASD scheduling problem), in order to use a space-filling curve, each one of the three parameters should be assigned to one of the axes of the underlying three-dimensional space. However, it may be the case that the space-filling curve does not treat the axes uniformly. In other words, a space filling curve may be biased towards one of the axes.

For example, the snake and the sweep space-filling curves (FIGS. 5a and 5b, respectively) are more biased towards the horizontal dimension (the x-axis 120). The reason is that both curves tend to schedule all the points in the x-direction first. In other words, these types of SFCs perform only one step in the y (vertical) direction 122 after performing seven contiguous steps in the x (horizontal) direction 120. The other space-filling curves shown in FIGS. 5c–5f tend to be less biased towards any of the dimensions. Therefore, when using the snake or the sweep space-filling curves of FIGS. 5a and 5b, the present invention considers these curve's aspects in assigning parameters to dimensions, as this affects the system performance due to the existing bias.

Unbounded Vs. Bounded Parameters

Some system parameters, e.g., the disk cylinder number, have an upper-bound, which is the maximum cylinder number. On the other hand, some parameters (e.g., absolute deadline) continually increase and do not typically have an upper-bound.

Some space-filling curves (e.g., the spiral curve of FIG. 5c) assume that all dimensions have an upper-bound. Similarly, other space-filling curves (e.g., the snake and the sweep of FIGS. 5a and 5b) may only have the unbounded parameter as their y-axis. In the preferred embodiment, the present invention does not include the x-axis being the unbounded one as some requests would starve while waiting to be scheduled. However, it is to be understood that the present invention is not limited to this, but includes using in an alternate embodiment the x-axis as the unbounded one depending upon the application at hand.

In choosing a space-filling curve for ordering and scheduling requests, the present invention considers the boundedness/unboundedness of the scheduling parameters as well as the nature of the space-filling curve that is chosen by considering the following cases:

Case 1: the space-filling curve uses upper-bounds in all dimensions, and all the scheduling parameters are also bounded.

Case 2: the space-filling curve uses upper-bounds in all dimensions, and only one of the scheduling parameters has no upper-bound.

Case 3. the space-filling curve does not require upper-bounds in all its dimensions, and similarly, all the scheduling parameters have no upper bounds Case 4: the space-filling curve does not require upper-bounds in all its dimensions, and any or all of the scheduling parameters are bounded.

Figure 6:
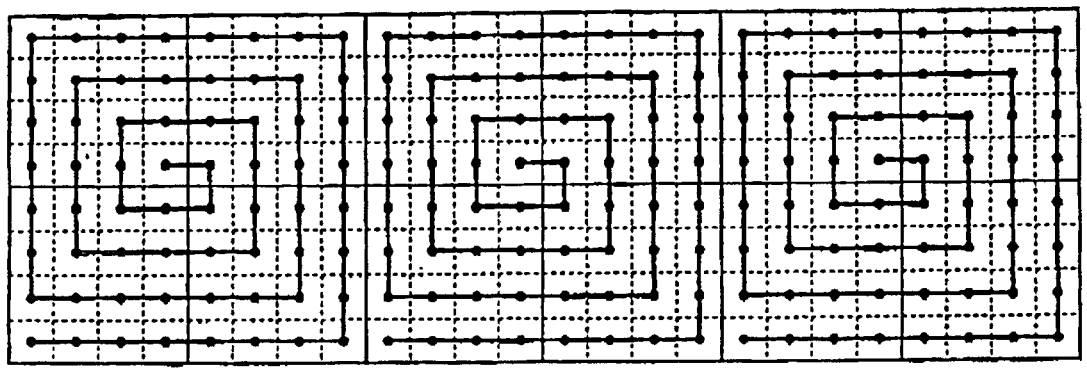
FIG. 6 is a graph diagram depicting a duplication of a space-filling curve across the unbounded dimension.

In Cases 1 and 3, the space-filling curve is used directly without any changes. In Case 2, the space-filling curve along the unbounded dimension is duplicated/repeated (see FIG. 6). Finally, in Case 4, since the space-filling curve does not require upper-bounds (e.g., the Peano, Hilbert, and the zig-zag space-filling curves), whenever the upper-bounds of the parameters in any of the dimensions is reached, then the space-filling curve is truncated until all the space is filled out. Once this happens, the space-filling curve is restarted from the origin of the space.

Reverse Ordering

Figure 7:
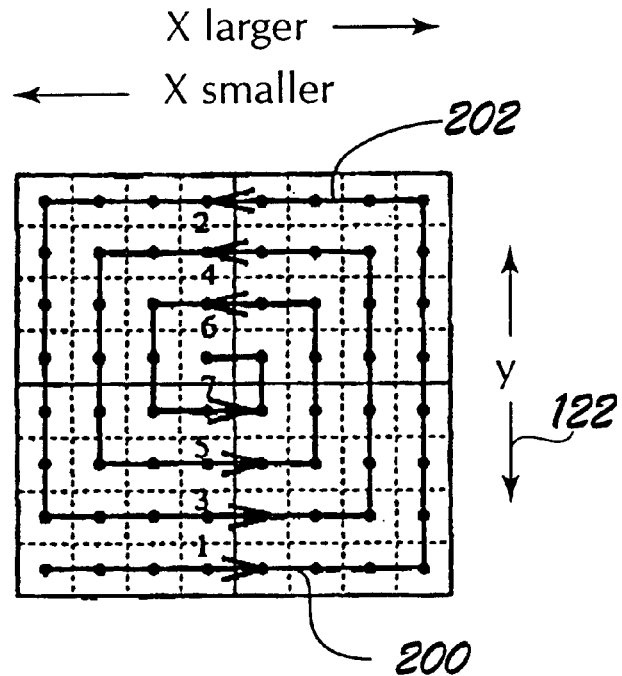
FIG. 7 is a graph diagram depicting an example of how requests are scheduled in reverse order in an embodiment of the present invention.

In reverse ordering of scheduling points, the order of visiting the points of the underlying space is examined. For example In FIG. 7 which contains a spiral space-filling curve, the order in which the horizontal stripes are visited is numbered 1–7. Observe that the order induced by this space filling curve alternates. At one time, the order of visiting the points is from smallest to largest in following path 200 forwards, and in the following time, the order of visiting the points is from largest to smallest in following path 202 in reverse. Similar behavior in the vertical direction is exhibited as well. Within the present invention, the visiting the points from largest to smallest is referred to as "reverse ordering".

Figure 8:
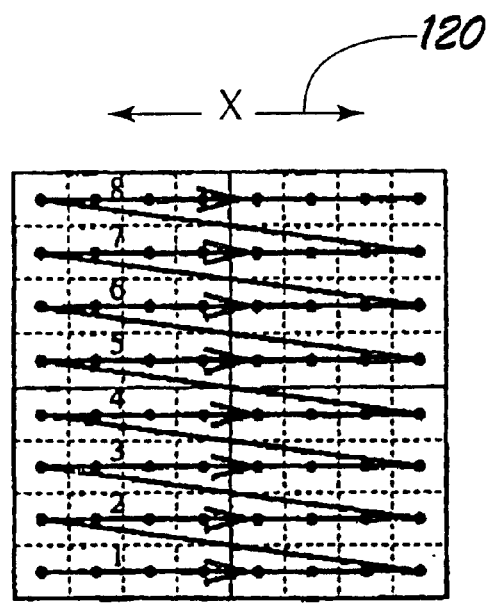
FIG. 8 is a graph diagram depicting an example of how a sweep space-filling curve orders points in one direction while addressing jumps.
Figure 9:
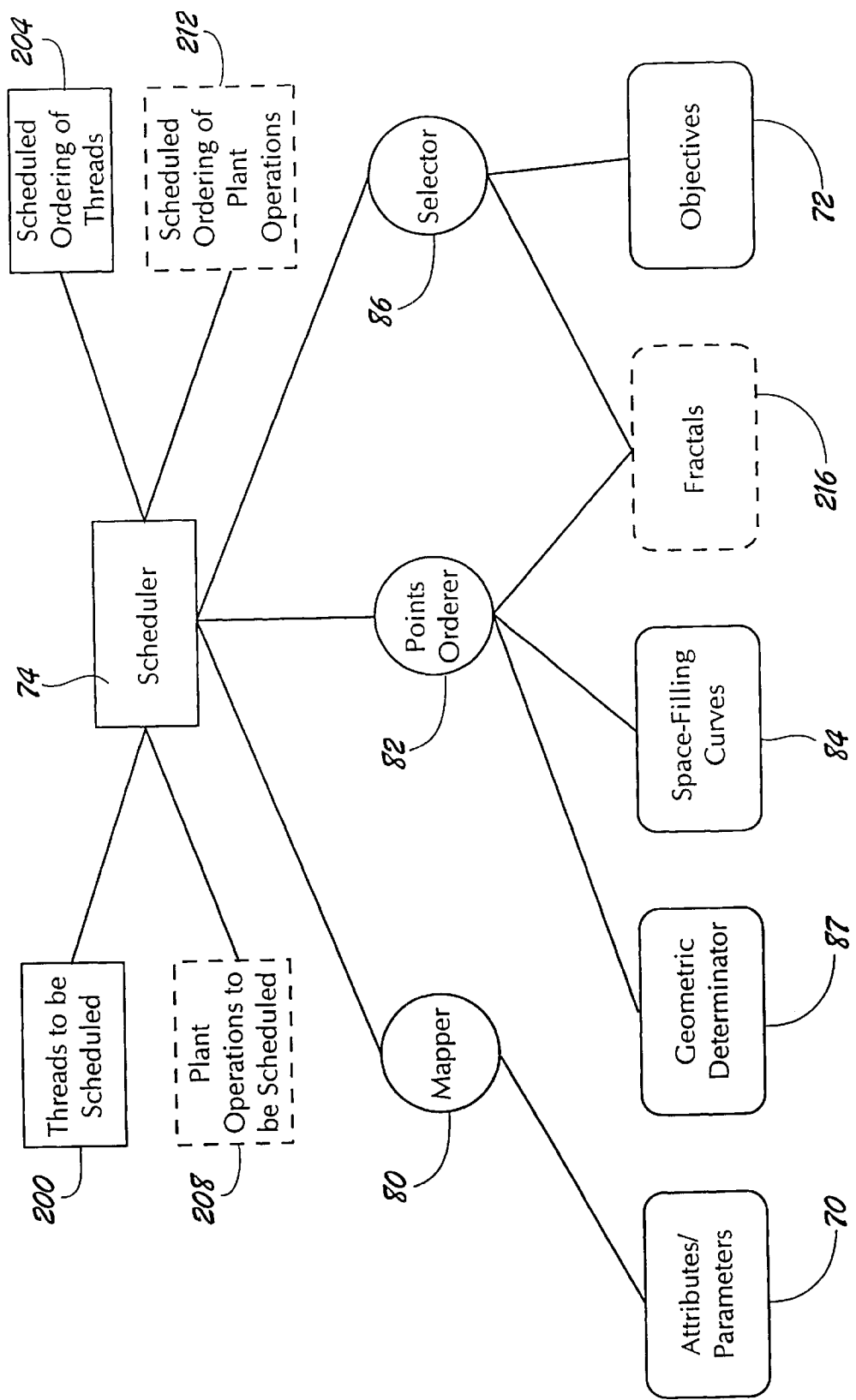
FIG. 9 is a block diagram depicting the functions and data utilized by the present invention in handling other exemplary applications.

On the other hand and with reference to FIG. 8, consider the sweep space-filling curve. The points in the horizontal (x) axis 120 are visited in the order from smallest to largest.

Whether reverse ordering is unfavorable or not relates to the semantics of the sorted parameter. For example, consider the real-time deadline as such a parameter. Then, scheduling from largest to smallest, i.e., in reverse order, means that the points with a larger deadline are scheduled before the points with a smaller deadline. In this case, reverse ordering is typically considered unfavorable.

As another example, consider the case of disk-head scheduling. Based on the disk-head movement, alternating between forward and reverse ordering is favorable. Within the field of the present invention, this is referred to as a circular scan algorithm. However, scheduling in the forward direction only is considered less favorable (this is referred to within the field of the present invention as a scan algorithm).

Thus, the present invention considers in its scheduling approach whether a space-filling curve exhibits reverse ordering in any/all of its dimensions or not. This approach of the present invention benefits the performance of the system when assigning the scheduling parameters to the various dimensions/axes.

SFC Jumps and Their Relation to Scheduling

Another factor related to using space-filling curves in scheduling is "jumps". Jumps in a space-filling curve reflect the locality of the consecutive points in the order implied by the space-filling curve. For example, consider the sweep space-filling curve of FIG. 5b, in contrast to the snake space-filling curve of FIG. 5a. Based on the discussion above, an advantage of the sweep over the snake curves is that the sweep scans the space without using reverse ordering, while the snake curve does. However, one advantage of the snake space-filling curve over the sweep space-filling curve is that the sweep space-filling curve does not exhibit jumps while the snake space-filling curve does. By the end of each horizontal sweep, the sweep space-filling curve jumps back to the beginning of the horizontal axis while advancing the vertical axis by one step as indicated by jump 124.

Similar to reverse ordering, jumps may or may not be favorable according to the application. For example, in disk-head scheduling, jumps are considered disadvantageous, as they result in a longer seek time without retrieving any data.

Intentional Bias

Although being unbiased to any one of the dimensions of the scheduling space is typically considered a positive aspect of a space-filling curve, in an alternate embodiment, the present invention biases the NASD scheduler towards a certain aspect of performance. In this embodiment, the present invention, for example, has a higher goal of reducing the number of requests that lose their deadline, than increasing the disk or network bandwidth. In this embodiment, the present invention favors the real-time deadline dimension of the scheduling space.

The present invention achieves this intentional bias towards one of the dimensions through several techniques while still using space-filling curves. One technique is to scale down (reduce) the resolution of the dimension that is to be favored over the scale of the other dimensions. This way, the scheduler spends more time (or makes bigger jumps) in the scaled down axis, while being more detailed (or slower) in the other dimensions, and hence favoring the scaled down dimension over the other dimensions.

The Effect of Packet-Level Scheduling

In another alternate embodiment, instead of scheduling at the disk page-level granularity, the present invention schedules at the packet-level granularity.

With page-level scheduling, a page is copied from the buffer pool to the network interface hardware. The page is divided into packets and a packet is sent one at a time over the network. If the NASD experiences network delays, the network interface hardware usually has no other option but to send out the remaining packets of the same page. This results in additional delay that lowers the overall NASD bandwidth.

With packet-level scheduling in this alternate embodiment, once the network interface hardware determines that the packets of a page are experiencing significant network delays, it switches to shipping another page (or packet) from the NASD buffer pool instead of waiting to finish shipping all the packets of the current page. To assist in accomplishing this, the present invention keeps track of partial status of which packets of a page are sent out and which are still to be sent out. This results in better overall NASD bandwidth for the price of additional overhead for bookkeeping.

While the present invention has been described in its presently preferred form, it is to be understood that there are numerous applications and implementations for the present invention. For example, and as mentioned above, the present invention has applications in computer operations other than disk scheduling. For example, the present invention can be used to schedule computer threads 200. Threads 200 need to be scheduled by scheduler 74 so as to optimize the time required for their functions to be achieved. Attributes 70 of the threads are mapped onto an n-dimensional space by mapper 80. For sake of a non-limiting example, such thread attributes may include when the thread needs to have its processing completed, the priority/importance of the thread, the amount of time needed for the thread to complete its processing, the effect of missing a thread's deadline, etc. A space-filling curve is selected by selector 86 and used by module 82 to provide a linear ordering 204 of the points.

The present invention is not limited to computer operations, but also includes such other scheduling applications as scheduling operations 208 in a manufacturing plant. Attributes 70 of the plant operations are mapped onto an n-dimensional space by mapper 80. For sake of a non-limiting example, such plant operation attributes may include when the plant operation needs to have its processing completed, the priority/importance of the operation, the amount of time needed for the operation to complete its processing, the effect of missing a plant operation's deadline, etc. A space-filling curve is selected by selector 86 and used by module 82 to provide a linear ordering 204 of the points.

Moreover, the present invention utilizes fractals 216 in order to provide a linear order to the points. Fractals are typically geometrical shapes whose structure is such that magnification by a given factor reproduces the original object. Fractals are generally discussed in the following reference: Peitgen et al., Chaos and Fractals, Chapter 2, Springer-Verlag, New York, 1992. A fractal can be selected based upon the following characteristics: whether a fractal is pre-disposed towards an axis being bounded or unbounded in the n-dimensional space; whether a fractal is biased towards one of the axes; whether a fractal exhibits reverse ordering in any/all of its dimensions; and whether a fractal exhibits "jumps" in any of its dimensions. In fact, fractals can be viewed as a subset of space-filling curves.

Accordingly, the invention is capable of modification and changes without departing from the spirit of the invention as set forth in the appended claims.

It is claimed:

1. A computer-implemented disk scheduling method for scheduling requests regarding at least one item on a disk, comprising the steps of:
   (a) receiving said request;
   (b) identifying predetermined attributes regarding said received request;
   (c) using a space-filling curve with respect to said attributes in order to determine a scheduling order for servicing said received request; and
   (d) scheduling said request based upon said determined scheduling order.

2. The method of claim 1 further comprising the steps of:
   mapping said attributes into an n-dimensional space; and
   using said space filling curve with respect to said mapped attributes in order to determine said scheduling order for servicing said received request.

3. The method of claim 1 further comprising the step of:
   mapping said attributes onto said space filling curve so that said mapped attributes constitutes a single-dimensional problem space.

4. The method of claim 3 wherein the attributes include location on the disk, deadline, and destination.

5. The method of claim 1 further comprising the steps of:
   receiving requests regarding items on the disk;
   mapping the attributes for each of the requests onto an n-dimensional space;
   using a space-filling curve with respect to the attributes in order to linearly order the received requests; and
   scheduling the requests based upon the linearly ordering of the requests.

6. The method of claim 1 further comprising the step of:
   using a space-filling curve for ordering the request so that concurrently a plurality of measures of goodness are substantially optimized.

7. The method of claim 6 wherein the measures of goodness includes at least two parameters being selected from the group consisting of missed deadlines, network bandwidth, disk utilization, and NASD buffer pool occupancy.

8. The method of claim 1 further comprising the step of:
   using a space-filling curve based upon at least one characteristic of the space-filling curve.

9. The method of claim 8 wherein the characteristic is selected from the group consisting of boundness, axis bias, reverse ordering, and jumps.

10. The method of claim 1 further comprising the step of:
    using a space-filling curve based upon characteristics of the space-filling curve.

11. The method of claim 10 wherein the characteristics are selected from the group consisting of boundness, axis bias, reverse ordering, jumps, and combinations thereof.

12. The method of claim 1 further comprising the steps of:
    receiving the request from a client over a network; and
    sending the requested item to the client based upon the determined scheduling ordering.

13. The method of claim 1 further comprising the steps of:
    sending requests from client applications on the network to a network-attached storage device on the network; and
    utilizing the steps (b)-(d) for the network-attached storage device in order to determine a scheduling order for servicing the sent requests.

14. The method of claim 1 further comprising the steps of:
    sending requests from client applications on the network to network-attached storage devices on the network; and
    utilizing the steps (b)-(d) for each of the network-attached storage devices in order to determine a scheduling order for servicing the sent requests.

15. The method of claim 1 further comprising the steps of:
    using a space-filling curve that uses upper-bounds in all dimensions when only one of the attributes contains no upper-bound; and
    repeating the space-filling curve along the unbounded dimension.

16. The method of claim 1 further comprising the steps of:
    using a space-filling curve selected from the group consisting of a snake space-filling curve, a sweep space-filling curve, a spiral space-filling curve, a zig-zag space-filling curve, a peano space-filling curve, and an Hilbert space-filling curve.

17. The method of claim 16 further comprising the step of:
    using the space-filling curve based upon characteristics of the space-filling curve, said characteristics being selected from the group consisting of boundness, axis bias, reverse ordering, jumps, and combinations thereof,
    and wherein the characteristics of the space-filling curve concurrently substantially optimize a plurality of measures of goodness, wherein the measures of goodness includes at least two parameters being selected from the group consisting of missed deadlines, network bandwidth, disk utilization, and NASD buffer pool occupancy.

18. The method of claim 1 wherein the space-filling curve is a fractal.

19. A computer-implemented scheduling method for scheduling operations relating to a predetermined activity, comprising the steps of:
    (a) receiving operational data indicative of said operations;
    (b) identifying predetermined attributes regarding said received operational data;

(c) imposing a linear ordering of the attributes via a predetermined curve, said curve being an aggregation of at least substantially continuous functions from intervals so as to form a substantially repetitive pattern; and (d) scheduling the operations based upon the imposed linear ordering.

20. The method of claim 19 further comprising the step of:

imposing a linear ordering of the mapped attributes via a space-filling curve.

21. The method of claim 19 further comprising the step of:

imposing a linear ordering of the mapped attributes via a fractal.

22. The method of claim 19 further comprising the steps of:

mapping said attributes into an n-dimensional space; and using said curve with respect to said mapped attributes to determine said scheduling order for processing said received operational data.

23. The method of claim 19 further comprising the step of:

mapping said attributes onto a space filling curve so that said mapped attributes constitutes a single-dimensional problem space.

24. The method of claim 23 wherein the attributes include location on the disk, deadline, and destination.

25. The method of claim 19 further comprising the steps of:

receiving requests regarding items on a computer storage medium;

mapping the attributes for each of the requests onto an n-dimensional space;

using a space-filling curve with respect to the attributes in order to linearly order the received requests; and scheduling the requests based upon the linear ordering of the requests.

26. The method of claim 19 further comprising the step of:

using the space-filling curve for ordering the operations so that concurrently a plurality of measures of goodness are substantially optimized.

27. The method of claim 26 wherein the measures of goodness includes importance of missed deadlines.

28. The method of claim 19 further comprising the step of:

using a curve based upon at least one characteristic of the curve.

29. The method of claim 28 wherein the characteristic is selected from the group consisting of boundness, axis bias, reverse ordering, and jumps.

30. The method of claim 19 further comprising the steps of:

using a space-filling curve that uses upper-bounds in all dimensions when only one of the attributes contains no upper-bound; and repeating the space-filling curve along the unbounded dimension.

31. The method of claim 19 further comprising the steps of:

using a curve selected from the group consisting of a snake space-filling curve, a sweep space-filling curve, a spiral space-filling curve, a zig-zag space-filling curve, a peano space-filling curve, and an Hilbert space-filling curve.

32. The method of claim 31 further comprising the step of:

using a curve based upon characteristics of the curve, said characteristics being selected from the group consisting of boundness, axis bias, reverse ordering, jumps, and combinations thereof, and wherein the characteristics of the curve concurrently substantially optimize a plurality of measures of goodness.

33. The method of claim 19 wherein the predetermined activity is a computer disk scheduling activity, said method further comprising the step of:

receiving operational data indicative of the disk scheduling activity.

34. The method of claim 19 wherein the predetermined activity is a computer-implemented thread scheduling activity, said method further comprising the step of:

receiving operational data indicative of the thread scheduling activity.

35. The method of claim 19 wherein the predetermined activity is a manufacturing plant operation scheduling activity, said method further comprising the step of:

receiving operational data indicative of the manufacturing plant operation scheduling activity.

36. A computer-implemented scheduling apparatus for scheduling operations relating to a predetermined activity, comprising:

an input for receiving operational data indicative of said operations;

a mapper module for identifying predetermined attributes regarding said received operational data;

a points orderer module for imposing an ordering of the identified attributes via a predetermined curve, said curve being an aggregation of at least substantially continuous functions from intervals so as to form a substantially repetitive pattern; and whereby the operations are scheduled based upon the imposed ordering.

37. The apparatus of claim 36 wherein the points orderer module imposes a linear ordering of the mapped attributes via a space-filling curve.

38. The apparatus of claim 36 further comprising the step of:

wherein the points orderer module imposes a linear ordering of the mapped attributes via a fractal.

39. The apparatus of claim 36 wherein the mapper module maps said attributes into an n-dimensional space, said points orderer module using said curve with respect to said mapped attributes to determine said scheduling order for processing said received operational data.

40. The apparatus of claim 36 wherein the mapper module maps said attributes onto a space filling curve so that said mapped attributes constitutes a single-dimensional problem space.

41. The apparatus of claim 40 wherein the attributes include location on the disk, deadline, and destination.

42. The apparatus of claim 36 wherein the points orderer module uses a space-filling curve for ordering the operations so that concurrently a plurality of measures of goodness are substantially optimized.

43. The apparatus of claim 42 wherein the measures of goodness includes importance of missed deadlines.

44. The apparatus of claim 36 wherein the points orderer module uses a curve based upon at least one characteristic of the curve.

45. The apparatus of claim 44 wherein the characteristic is selected from the group consisting of boundness, axis bias, reverse ordering, and jumps.

46. The apparatus of claim 36 wherein the points orderer modules uses a space-filling curve that uses upper-bounds in all dimensions when only one of the attributes contains no upper-bound.

47. The apparatus of claim 36 wherein the points orderer module uses a curve selected from the group consisting of a snake space-filling curve, a sweep space-filling curve, a spiral space-filling curve, a zig-zag space-filling curve, a peano space-filling curve, and an Hilbert space-filling curve.

48. The apparatus of claim 47 wherein the points orderer module uses a curve based upon characteristics of the curve, said characteristics being selected from the group consisting of boundness, axis bias, reverse ordering, jumps, and combinations thereof, and wherein the characteristics of the curve concurrently substantially optimize a plurality of measures of goodness.

49. The apparatus of claim 36 wherein the predetermined activity is a computer disk scheduling activity, said input receiving operational data indicative of the disk scheduling activity.

50. The apparatus of claim 36 wherein the predetermined activity is a computer-implemented thread scheduling activity, said input receiving operational data indicative of the thread scheduling activity.

51. The apparatus of claim 36 wherein the predetermined activity is a manufacturing plant operation scheduling activity, said input receiving operational data indicative of the manufacturing plant operation scheduling activity.

52. The apparatus of claim 36 further comprising:
 a mapper module for mapping the attributes into an n-dimensional space; and
 a geometric data determinator for determining geometric characteristics related to the mapped attributes in order to determine how the curve should intersect with the mapped attributes.

* * * * *

UNITED STATES PATENT AND TRADEMARK OFFICE
CERTIFICATE OF CORRECTION

PATENT NO.      : 6,473,809 B1
DATED           : October 29, 2002
INVENTOR(S)     : Walid G. Aref et al.

It is certified that error appears in the above-identified patent and that said Letters Patent is hereby corrected as shown below:

<u>Title page, Item [54] and Column 1, lines 1-3,</u>
Title , "SCHEDULING METHOD AND APPARATUS FOR NETWORK-ATTACHED STORAGE DEVICES AND OTHER SYSTEMS" should be
-- SCHEDULING METHOD AND APPARATUS FOR NETWORK-ATTACHED STORAGE DEVICES AND OTHER SYSTEMS UTILIZING SPACE-FILLING CURVES FOR SCHEDULING REQUESTS --.

Signed and Sealed this

Twenty-fourth Day of June, 2003

JAMES E. ROGAN
*Director of the United States Patent and Trademark Office*